United States Patent
Adamek et al.

(10) Patent No.: US 12,136,299 B2
(45) Date of Patent: Nov. 5, 2024

(54) FILTRATION SYSTEMS WITH MULTITIERED DATA EXCHANGE CAPABILITIES

(71) Applicant: Donaldson Company, Inc., Minneapolis, MN (US)

(72) Inventors: Daniel E. Adamek, Bloomington, MN (US); Brian R. Tucker, Farmington, MN (US); David W. Mulder, Bloomington, MN (US); Matthew J. Anderson, Minneapolis, MN (US); Michael J. Lockert, Cedar Falls, IA (US)

(73) Assignee: Donaldson Company, Inc., Bloomington, MN (US)

( * ) Notice: Subject to any disclaimer, the term of this patent is extended or adjusted under 35 U.S.C. 154(b) by 614 days.

(21) Appl. No.: 17/277,422

(22) PCT Filed: Sep. 18, 2019

(86) PCT No.: PCT/US2019/051768
§ 371 (c)(1),
(2) Date: Mar. 18, 2021

(87) PCT Pub. No.: WO2020/061219
PCT Pub. Date: Mar. 26, 2020

(65) Prior Publication Data
US 2022/0036663 A1  Feb. 3, 2022

Related U.S. Application Data

(60) Provisional application No. 62/732,844, filed on Sep. 18, 2018.

(51) Int. Cl.
*G07C 5/00* (2006.01)
*B01D 46/00* (2022.01)
*B01D 46/44* (2006.01)

(52) U.S. Cl.
CPC ......... *G07C 5/006* (2013.01); *B01D 46/0086* (2013.01); *B01D 46/446* (2013.01);
(Continued)

(58) Field of Classification Search
CPC ...... G07C 5/006; G07C 5/008; G07C 5/0841; B01D 46/0086; B01D 46/429;
(Continued)

(56) References Cited

U.S. PATENT DOCUMENTS

| 4,350,504 A | 9/1982 | Diachuk |
| 5,121,599 A | 6/1992 | Snyder et al. |

(Continued)

FOREIGN PATENT DOCUMENTS

| CN | 100384508 | 4/2008 |
| CN | 100457232 | 2/2009 |

(Continued)

OTHER PUBLICATIONS

"Extended European Search Report," for European Patent Application No. 23162504.7 mailed Sep. 28, 2023 (6 pages).
(Continued)

*Primary Examiner* — Andrew R Dyer
(74) *Attorney, Agent, or Firm* — Pauly, DeVries Smith & Deffner LLC

(57) ABSTRACT

Aspects herein include filtration systems with multitiered data exchange capabilities. In an embodiment, a filtration system with multitiered data exchange capabilities is included. The system can include a first data communication tier including a filter element, the filter element storing data, and a first sensor. The system can include a second data communication tier including a reader device in communication with the first sensor. The system can include a third data communication tier including an engine control unit (ECU) in communication with the reader device, wherein
(Continued)

the ECU stores data. The second data communication tier receives data from the first data communication tier and the third data communication tier. The second data communication tier executes operations on the received data to create a processed data set. Further, the second data communication tier sends the processed data set to the third data communication tier. Other embodiments are also included herein.

18 Claims, 16 Drawing Sheets

(52) U.S. Cl.
 CPC ............ *B01D 46/448* (2013.01); *G07C 5/008* (2013.01); *B01D 2279/60* (2013.01)

(58) Field of Classification Search
 CPC ................ B01D 46/446; B01D 46/448; B01D 2279/60; F01N 2260/24; F01N 2550/04; F02M 35/09
 USPC ........................................................ 701/29.4
 See application file for complete search history.

(56) References Cited

U.S. PATENT DOCUMENTS

| | | | |
|---|---|---|---|
| 5,279,609 | A | 1/1994 | Meckler |
| 5,767,793 | A | 6/1998 | Agravante et al. |
| 6,051,144 | A | 4/2000 | Clack et al. |
| 6,551,503 | B2 | 4/2003 | Niers et al. |
| 6,652,614 | B2 | 11/2003 | Gieseke et al. |
| 6,782,240 | B1 | 8/2004 | Tabe |
| 6,936,160 | B2 | 8/2005 | Moscaritolo et al. |
| 7,052,525 | B2 | 5/2006 | Kang et al. |
| 7,223,364 | B1 | 5/2007 | Johnston et al. |
| 7,532,119 | B2* | 5/2009 | Bratkovski .......... G06K 7/0008 340/539.22 |
| 7,901,570 | B2 | 3/2011 | Grzonka et al. |
| 8,029,679 | B2 | 10/2011 | Grzonka et al. |
| 8,319,694 | B2 | 11/2012 | Yang et al. |
| 8,336,292 | B2 | 12/2012 | Bloms et al. |
| 8,570,156 | B2 | 10/2013 | Barvick et al. |
| 8,615,374 | B1* | 12/2013 | Discenzo ................ G06F 15/00 340/521 |
| 8,646,695 | B2 | 2/2014 | Worrall et al. |
| 8,705,527 | B1* | 4/2014 | Addepalli .......... H04L 63/0227 370/389 |
| 8,717,244 | B2 | 5/2014 | Joyce, Jr. et al. |
| 9,100,804 | B2* | 8/2015 | Draznin ................ H04W 4/70 |
| 9,168,882 | B1* | 10/2015 | Mirza ................ B60R 16/037 |
| 9,176,924 | B2* | 11/2015 | Ricci ..................... B60W 40/09 |
| 9,541,429 | B2 | 1/2017 | Farokhi et al. |
| 9,773,251 | B2* | 9/2017 | Liu ..................... G06Q 30/0251 |
| 9,774,508 | B1* | 9/2017 | Barrett ................... A61B 5/349 |
| 9,816,897 | B2* | 11/2017 | Ziarno ................ G07C 5/0841 |
| 10,025,960 | B1 | 7/2018 | Fink et al. |
| 10,184,415 | B2* | 1/2019 | Shimpi .................. B01D 37/00 |
| 10,427,082 | B2 | 10/2019 | Miller et al. |
| 10,702,823 | B2 | 7/2020 | Miller et al. |
| 11,090,599 | B2 | 8/2021 | Miller et al. |
| 11,189,152 | B2 | 11/2021 | Miller |
| 11,654,390 | B2 | 5/2023 | Miller et al. |
| 12,039,854 | B2 | 7/2024 | Miller |
| 2004/0079693 | A1 | 4/2004 | Hacker et al. |
| 2004/0256328 | A1 | 12/2004 | Jornitz et al. |
| 2005/0150304 | A1 | 7/2005 | Gustafson et al. |
| 2006/0124738 | A1 | 6/2006 | Wang et al. |
| 2008/0012710 | A1 | 1/2008 | Sadr |
| 2008/0143488 | A1 | 6/2008 | Yamamoto et al. |
| 2008/0229720 | A1* | 9/2008 | Benscoter .......... B01D 46/446 55/385.3 |
| 2009/0012694 | A1 | 1/2009 | Darr et al. |
| 2009/0015408 | A1 | 1/2009 | Asai et al. |
| 2009/0064774 | A1 | 3/2009 | Panzer et al. |
| 2009/0261659 | A1 | 10/2009 | Carrick et al. |
| 2010/0087983 | A1* | 4/2010 | Boss ...................... G06Q 10/20 701/31.4 |
| 2010/0106265 | A1* | 4/2010 | Ebrom ..................... H04L 69/26 700/90 |
| 2010/0115920 | A1 | 5/2010 | Bloms et al. |
| 2010/0217457 | A1 | 8/2010 | Georgi et al. |
| 2010/0247426 | A1 | 9/2010 | Wallace et al. |
| 2010/0332715 | A1* | 12/2010 | Hadden .............. G05B 19/0428 710/310 |
| 2011/0062060 | A1 | 3/2011 | Royal et al. |
| 2011/0220560 | A1 | 9/2011 | Verdegan et al. |
| 2012/0132573 | A1 | 5/2012 | Lautzenheiser et al. |
| 2012/0303204 | A1* | 11/2012 | Narisako .............. B01D 36/005 701/29.6 |
| 2013/0033381 | A1 | 2/2013 | Breed |
| 2013/0216673 | A1 | 8/2013 | Storek et al. |
| 2013/0220200 | A1 | 8/2013 | Milvert et al. |
| 2013/0251626 | A1 | 9/2013 | Wallace et al. |
| 2013/0275717 | A1* | 10/2013 | Wilson ................. G06F 9/5044 712/E9.002 |
| 2013/0342319 | A1 | 12/2013 | Rimai et al. |
| 2014/0032800 | A1* | 1/2014 | Peirce ..................... H04L 67/12 710/105 |
| 2014/0083766 | A1 | 3/2014 | Tips et al. |
| 2014/0260989 | A1 | 9/2014 | Sukhman et al. |
| 2015/0135336 | A1* | 5/2015 | Arasavelli ............. H04L 63/102 726/29 |
| 2015/0273381 | A1* | 10/2015 | Stoner, Jr. ............... B01D 46/62 96/418 |
| 2015/0290572 | A1 | 10/2015 | Stoner, Jr. et al. |
| 2015/0330857 | A1 | 11/2015 | Henderson et al. |
| 2015/0363832 | A1 | 12/2015 | Bleckmann |
| 2015/0369717 | A1 | 12/2015 | Twiss |
| 2016/0045854 | A1 | 2/2016 | Hung et al. |
| 2016/0046502 | A1 | 2/2016 | Rice |
| 2016/0048142 | A1 | 2/2016 | Chan et al. |
| 2016/0166954 | A1 | 6/2016 | Peleg et al. |
| 2016/0273471 | A1 | 9/2016 | Shimpi et al. |
| 2016/0348618 | A1* | 12/2016 | Detsch ............... G01N 15/0806 |
| 2016/0369797 | A1 | 12/2016 | Pribanic et al. |
| 2017/0032589 | A1* | 2/2017 | Zagajac .................. G07C 5/085 |
| 2017/0050130 | A1 | 2/2017 | Bippus et al. |
| 2017/0050139 | A1 | 2/2017 | Schrage et al. |
| 2017/0080363 | A1 | 3/2017 | Krause et al. |
| 2017/0173505 | A1 | 6/2017 | Dhingra et al. |
| 2017/0183215 | A1* | 6/2017 | Ayers ....................... B67D 7/32 |
| 2017/0211498 | A1* | 7/2017 | Moore .................. F02M 35/024 |
| 2017/0286497 | A1* | 10/2017 | Crabtree .................. H04L 67/12 |
| 2017/0345232 | A1* | 11/2017 | Hunt ....................... G07C 5/085 |
| 2018/0056899 | A1 | 3/2018 | Franz |
| 2018/0117508 | A1 | 5/2018 | Paluszewski et al. |
| 2018/0144559 | A1* | 5/2018 | Hukill ..................... G01S 19/24 |
| 2018/0172661 | A1 | 6/2018 | Spengler et al. |
| 2018/0173505 | A1 | 6/2018 | Yan |
| 2018/0186655 | A1 | 7/2018 | Cobb et al. |
| 2018/0229744 | A1* | 8/2018 | Manzari .................. F01M 11/10 |
| 2018/0232959 | A1* | 8/2018 | Thornburg .......... H04L 43/0805 |
| 2019/0001250 | A1* | 1/2019 | Moredock ............ B01D 46/446 |
| 2019/0054411 | A1* | 2/2019 | Miller ................... B01D 29/114 |
| 2019/0076760 | A1 | 3/2019 | Surdick et al. |
| 2019/0167188 | A1 | 6/2019 | Gifford, III et al. |
| 2019/0168584 | A1 | 6/2019 | Seiferlein et al. |
| 2019/0298208 | A1 | 10/2019 | Weinstein et al. |
| 2019/0306030 | A1 | 10/2019 | Chen |
| 2020/0009491 | A1 | 1/2020 | Miller et al. |
| 2020/0045932 | A1 | 2/2020 | Knight et al. |
| 2020/0285778 | A1 | 9/2020 | Soffer |
| 2020/0298166 | A1 | 9/2020 | Miller et al. |
| 2020/0388138 | A1 | 12/2020 | Miller |
| 2021/0402342 | A1 | 12/2021 | Miller et al. |
| 2022/0084387 | A1 | 3/2022 | Miller |
| 2022/0136471 | A1 | 5/2022 | Shimpi et al. |

(56) References Cited

U.S. PATENT DOCUMENTS

| | | | |
|---|---|---|---|
| 2022/0208391 | A1 | 6/2022 | Mekid et al. |
| 2023/0372856 | A1 | 11/2023 | Miller et al. |

FOREIGN PATENT DOCUMENTS

| | | |
|---|---|---|
| CN | 101512546 | 8/2009 |
| CN | 101517595 | 8/2009 |
| CN | 104801099 | 7/2015 |
| CN | 104941302 | 9/2015 |
| CN | 104941303 | 9/2015 |
| CN | 105396365 | 3/2016 |
| CN | 105611987 | 5/2016 |
| CN | 206348002 | 7/2017 |
| CN | 106999811 | 8/2017 |
| CN | 108014533 | 5/2018 |
| CN | 108368788 | 8/2018 |
| CN | 109121088 | 1/2019 |
| CN | 113056600 | 6/2021 |
| CN | 114174771 | 3/2022 |
| DE | 102013004112 | 9/2014 |
| EP | 1830173 | 9/2007 |
| EP | 3029388 | 6/2016 |
| EP | 3133049 | 2/2017 |
| EP | 3315183 | 5/2018 |
| EP | 3853467 | 3/2023 |
| EP | 4234914 | 8/2023 |
| JP | 2002334134 | 11/2002 |
| JP | 2005353026 | 12/2005 |
| JP | 2011514241 | 5/2011 |
| JP | 2012048287 | 3/2012 |
| JP | 2012203670 | 10/2012 |
| JP | 2012241657 | 12/2012 |
| WO | 2004029740 | 4/2004 |
| WO | 2008007625 | 1/2008 |
| WO | 2009033923 | 3/2009 |
| WO | 2012018965 | 2/2012 |
| WO | 2014203378 | 12/2014 |
| WO | 2015002307 | 1/2015 |
| WO | 2015057956 | 4/2015 |
| WO | 2016011580 | 1/2016 |
| WO | 2016036401 | 3/2016 |
| WO | 2016096786 | 6/2016 |
| WO | 2017030809 | 2/2017 |
| WO | 2017112547 | 6/2017 |
| WO | 2017164125 | 9/2017 |
| WO | 2017192729 | 11/2017 |
| WO | 2018165146 | 9/2018 |
| WO | 2019036542 | 2/2019 |
| WO | 2020061219 | 3/2020 |
| WO | 2020247813 | 12/2020 |

OTHER PUBLICATIONS

"Final Office Action," for U.S. Appl. No. 17/537,191 mailed Oct. 20, 2023 (25 pages).
"First Office Action," for Chinese Patent Application No. 202080038876.9 mailed Oct. 21, 2023 (36 pages).
"Non-Final Office Action," for U.S. Appl. No. 17/537,191 mailed Jun. 12, 2023 (25 pages).
"Office Action," for Australian Patent Application No. 2018031741 mailed Apr. 5, 2023 (4 pages).
"Office Action," for Japanese Patent Application No. 2021507033 mailed Jul. 31, 2023 (12 pages) with English Translation.
"Response to Non Final Office Action," for U.S. Appl. No. 17/537,191, filed Sep. 6, 2023 (10 pages).
"First Examination Report," for Indian Patent Application No. 202117003387 mailed Oct. 7, 2022 (8 pages).
"Non-Final Office Action," for U.S. Appl. No. 17/537,191 mailed Jan. 26, 2023 (23 pages).
"Notice of Allowance," for U.S. Appl. No. 17/363,947 mailed Jan. 17, 2023 (13 pages).
"Response to Non-Final Office Action," for U.S. Appl. No. 17/363,947, filed Dec. 28, 2022 (7 pages).
File History for U.S. Appl. No. 16/102,277 downloaded Jun. 11, 2021 (269 pages).
File History for U.S. Appl. No. 16/572,246 downloaded Jun. 11, 2021 (732 pages).
File History for U.S. Appl. No. 16/898,106 downloaded Jun. 11, 2021 (509 pages).
File History for U.S. Appl. No. 15/893,347 downloaded Jun. 11, 2021 (160 pages).
"First Office Action," for Chinese Patent Application No. 201880053222.6 mailed May 31, 2021 (24 pages) with English translation.
"International Preliminary Report on Patentability," for PCT Application No. PCT/US2018/046810 mailed Feb. 27, 2020 (12 pages).
"International Preliminary Report on Patentability," for PCT Application No. PCT/US2019/051768 mailed Apr. 1, 2021 (9 pages).
"International Search Report and Written Opinion," for PCT Application No. PCT/US2018/046810 mailed Nov. 16, 2018 (19 pages).
"International Search Report and Written Opinion," for PCT Application No. PCT/US2019/051768 mailed Jan. 8, 2020 (15 pages).
"International Search Report and Written Opinion," for PCT Application No. PCT/US2020/036413 mailed Oct. 28, 2020 (19 pages).
"Invitation to Pay Additional Fees," for PCT Application No. PCT/US2020/036413 mailed Sep. 7, 2020 (14 pages).
"International Preliminary Report on Patentability," for PCT Application No. PCT/US2020/036413 mailed Dec. 16, 2021 (11 pages).
"Notice of Allowance," for U.S. Appl. No. 16/893,347 mailed Aug. 3, 2021 (13 pages).
"Response to Final Office Action," for U.S. Appl. No. 16/893,347, filed Jul. 6, 2021 (10 pages).
"First Examination Report," for India Patent Application No. 2020270082829 mailed Feb. 24, 2022 (6 pages).
"First Office Action," for Chinese Patent Application No. 201980053519.7 mailed Aug. 3, 2022 (37 pages) with English translation.
"Non-Final Office Action," for U.S. Appl. No. 17/363,947 mailed Sep. 28, 2022 (17 page).
"Communication Purusant to Article 94(3) EPC," for European Patent Application No. 20750424.2 mailed Nov. 29, 2023 (7 pages).
"Extended European Search Report," for European Patent Application No. 23162504.7 mailed Sep. 28, 2023 (7 pages).
"Non-Final Office Action," for U.S. Appl. No. 18/198,539 mailed Jan. 18, 2024 (30 pages).
"Notice of Allowance," for U.S. Appl. No. 17/537,191 mailed Mar. 11, 2024 (14 pages).
"Office Action," for Japanese Patent Application No. 2021-564393 mailed Apr. 15, 2024 (6 pages).
"Response to Final Office Action," for U.S. Appl. No. 17/537,191, filed Feb. 16, 2024 (9 pages).
"Response to Non Final Office Action," for U.S. Appl. No. 18/198,539, filed Apr. 17, 2024 (10 pages).
"Second Office Action," for Chinese Patent Application No. 202080038876.9 mailed Apr. 26, 2024 (39 pages) with English Translation.
"Communication Pursuant to Article 94(3) EPC," for European Patent Application No. 20750424.2 mailed Jul. 1, 2024 (5 pages).
"Final Office Action," for U.S. Appl. No. 18/198,539 mailed Jun. 28, 2024 (25 pages).
"Final Rejection Action," for Chinese Patent Application No. 202080038876.9 mailed Aug. 7, 2024 (31 pages) with English translation.
"Office Action," for Indian Patent Application No. 202117047098 mailed Sep. 2, 2024 (7 pages).
"Response to Final Office Action," for U.S. Appl. No. 18/198,539, filed on Sep. 26, 2024 (12 pages).

* cited by examiner

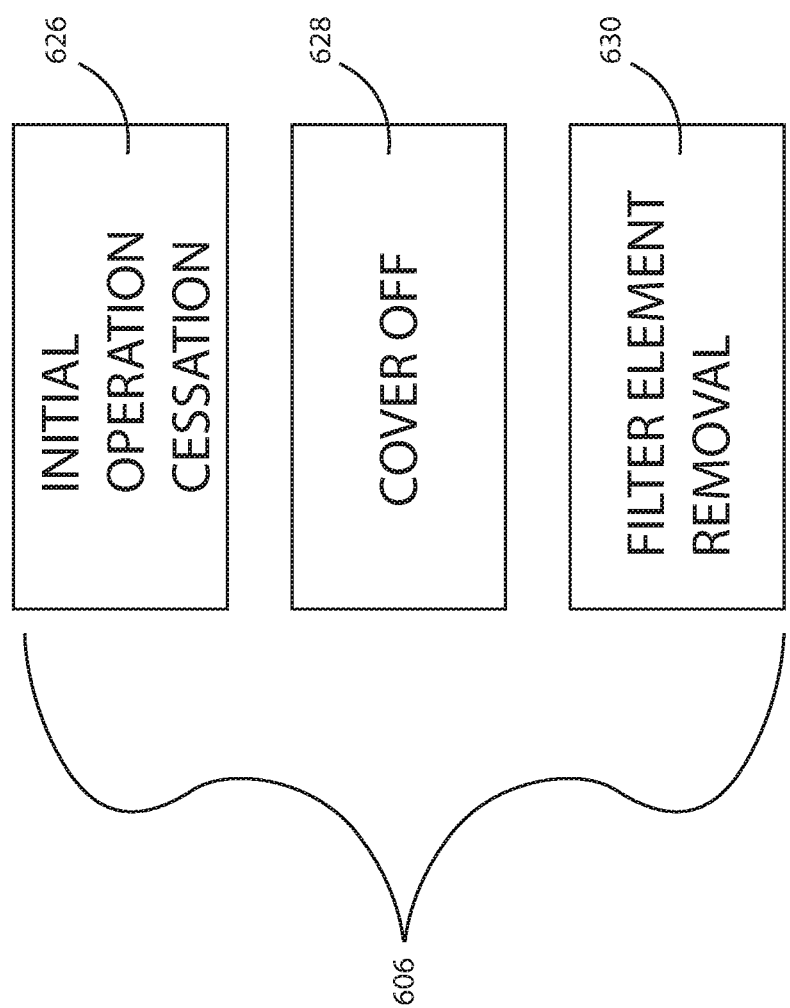

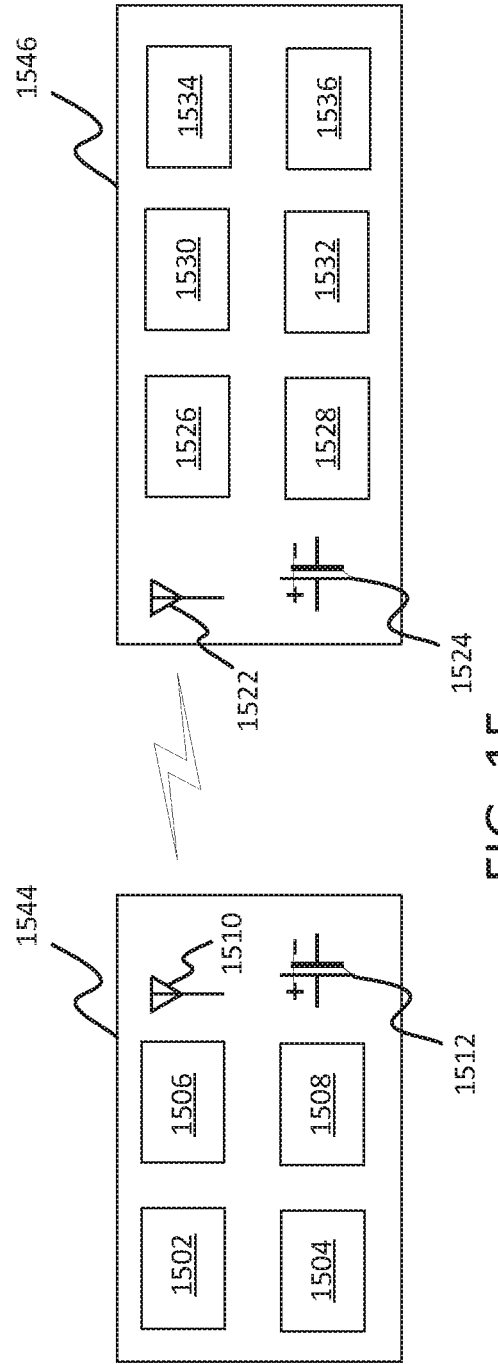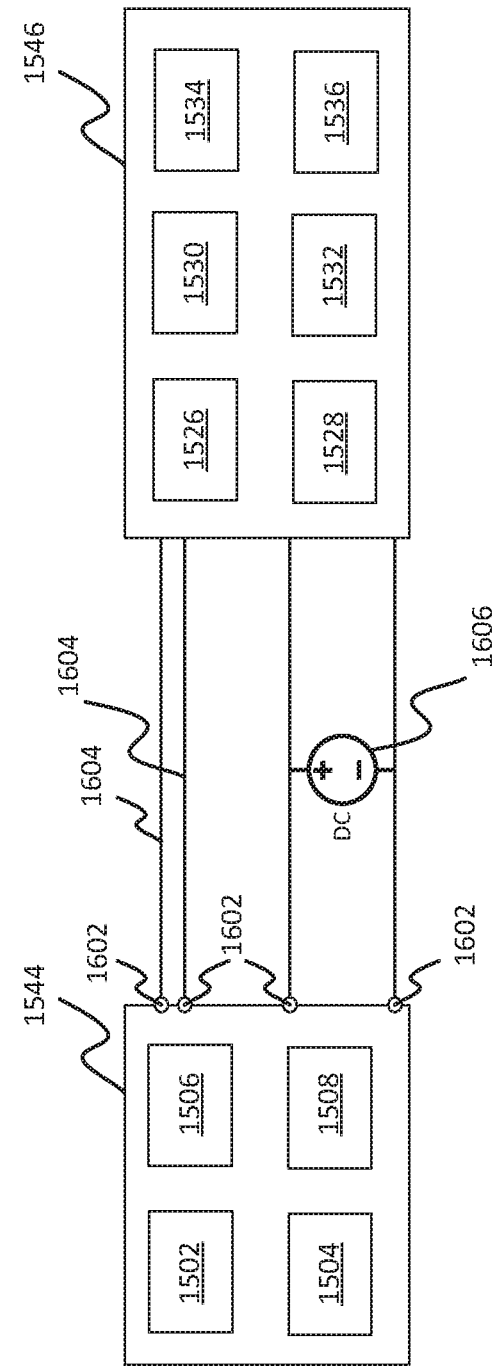

FILTRATION SYSTEMS WITH MULTITIERED DATA EXCHANGE CAPABILITIES

This application is being filed as a PCT International Patent application on Sep. 18, 2019 in the name of Donaldson Company, Inc., a U.S. national corporation, applicant for the designation of all countries and Daniel E. Adamek, a U.S. Citizen, Brian R. Tucker, a U.S. Citizen, David W. Mulder a U.S. Citizen, Matthew Anderson, a U.S. Citizen and Michael J. Lockert, a U.S. Citizen, inventors for the designation of all countries, and claims priority to U.S. Provisional Patent Application No. 62/732,844, filed Sep. 18, 2018, the contents of which are herein incorporated by reference in its/their entirety/entireties.

FIELD

Embodiments herein relate to filtration systems with multitiered data exchange capabilities.

BACKGROUND

Fluid streams often carry particulate material therein. In many instances, it is desirable to remove some or all of the particulate material from a fluid flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore desirable for such systems to remove the particulate material from the fluid flow upstream of the engine, turbine, furnace or other equipment involved. A variety of air filter or gas filter arrangements have been developed for particulate removal. Beyond particulate removal, filtration systems can also be used as gas phase or liquid phase contaminant removal systems.

SUMMARY

Embodiments include filter elements and filtration systems. In an embodiment, a filtration system with multitiered data exchange capabilities is included. The filtration system can include a first data communication tier. The first data communication tier can include a filter element, the filter element storing data, and a first sensor. The filtration system can include a second data communication tier. The second data communication tier can include a reader device in communication with at least one of the filter element and the first sensor. The filtration system can include a third data communication tier. The third data communication tier can include an engine control unit (ECU) in communication with the reader device. The ECU can store data. The second data communication tier can receive data from the first data communication tier and the third data communication tier. The second data communication tier can execute operations on the received data to create a processed data set. The second data communication tier can send the processed data set to the third data communication tier.

In an embodiment, a filtration system with multitiered data exchange capabilities is included. The filtration system can include a first data communication tier. The first data communication tier can include a filter element. The filter element can include a first sensor configured to generate data. The filtration system can include a second data communication tier. The second data communication tier can include a reader device in communication with the first sensor. The second data communication tier can receive data from the first data communication tier and a third data communication tier. The second data communication tier can execute operations on the received data to create a processed data set. The second data communication tier can send the processed data set to the third data communication tier.

In an embodiment, a filtration system with multitiered data exchange capabilities is included. The filtration system can include a first data communication tier. The first data communication tier can include a first sensor configured to generate data and a filter element. The filter element can include a second sensor configured to generate data. The filtration system can include a second data communication tier. The second data communication tier can include an engine control unit (ECU). The ECU can store data. The second data communication tier can receive data from the first data communication tier. The second data communication tier can execute operations on the received data to create a processed data set.

In an embodiment, a filtration system with multitiered data exchange capabilities is included. The filtration system can include a first data communication tier. The first data communication tier can include a first sensor configured to generate data and a filter element. The filter element can include a second sensor configured to generate data. The filtration system can include a second data communication tier. The second data communication tier can include a reader device in communication with the first sensor and the second sensor. The filtration system can also include a third data communication tier including an engine control unit (ECU) in communication with the reader device. The second data communication tier can receive data from the first data communication tier. The third data communication tier can receive data from the second data communication tier. The third data communication tier can execute operations on the received data to create a processed data set.

In an embodiment, a filtration system with multitiered data exchange capabilities is included. The filtration system can include a first data communication tier. The first data communication tier can include a filter element. The filter element can include a first sensor configured to generate data. The filtration system can include a second data communication tier. The second data communication tier can include a reader device in communication with the first sensor. The filtration system can include a third data communication tier. The third data communication tier can include an engine control unit (ECU) in communication with the reader device. The second data communication tier can receive data from the first data communication tier. The second data communication tier can execute operations on the received data to create a processed data set. The second data communication tier can send the processed data set to the third data communication tier.

In an embodiment, a filtration system with multitiered data exchange capabilities is included. The filtration system can include a first data communication tier. The first communication tier can include a filter element, the filter element including a first sensor configured to generate data. The filtration system can include a second data communication tier. The second data communication tier can include a reader device in communication with the first sensor. The filtration system can include a third data communication tier comprising an engine control unit (ECU) in communication with the reader device. The second data communication tier can receive data from the first data communication tier and the third data communication tier. The second data communication tier can execute operations on the received data to create a processed data set. The second data communication tier can send the processed data set to the filter element. The second data communication tier can send the processed data set to the third data communication tier.

In an embodiment, a filtration system with multitiered data exchange capabilities is included. The first data communication tier can include a first sensor configured to generate data and a filter element. The filter element can include a second sensor configured to generate data. The filtration system can include a second data communication tier. The second data communication tier can include a reader device in communication with the first sensor and the second sensor. The filtration system can further include a third data communication tier including an engine control unit (ECU) in communication with the reader device. The second data communication tier can receive data from the first data communication tier. The second data communication tier can execute operations on the received data to create a processed data set. The second data communication tier can send the processed data set to the filter element. The second data communication tier can send the processed data set to the third data communication tier.

In an embodiment, a filtration system with multitiered data exchange capabilities is included. The filtration system can include a first data communication tier including a filter element. The filtration system can include a second data communication tier including a reader device in communication with the filter element. The filtration system can include a third data communication tier including an engine control unit (ECU) in communication with the reader device. The second data communication tier can receive data from the third data communication tier. The second data communication tier can execute operations on the received data to create a processed data set. The second data communication tier can send the processed data set to the filter element. The second data communication tier can send the processed data set to the third data communication tier.

In an embodiment, a filtration system with multitiered data exchange capabilities is included. The filtration system can include a first data communication tier. The first data communication tier can include a filter element including a first sensor configured to generate data. The filtration system can also include a second data communication tier including a reader device in communication with the filter element. The filtration system can include a third data communication tier including an engine control unit (ECU) in communication with the reader device. The second data communication tier can receive data from the first data communication tier. The second data communication tier can execute operations on the received data to create a processed data set. The second data communication tier can send the processed data set to the third data communication tier.

In an embodiment, a filtration system is included. The filtration system can include a device configured to be in electronic communication with filter element. The device can include a processing circuit and a communication circuit. The device can receive data and determine an operational stage and/or substage of an engine or vehicle. Data communication between or amongst one or more data communication tiers of the filtration system can be directed based on a determination of the operational stage and/or substage of the engine or vehicle.

In an embodiment, a filtration system with multitiered data exchange capabilities is included. The filtration system can include a first data communication tier including a filter element. The filter element can include a data storage element. The filtration system can include a second data communication tier. The second data communication tier can include a reader device. The reader device can include a processing circuit and a communication circuit. The second data communication tier can receive data from the first data communication tier uniquely identifying the filter element. The second data communication tier can send data to the first data communication tier specifying previous filter elements installed in the filtration system.

In an embodiment, a filtration system with multitiered data exchange capabilities is included. The filtration system can include a first data communication tier including a first sensor. The filtration system can include a second data communication tier including a reader device in communication with the first sensor. The reader device can include a processing circuit and a communication circuit. The second data communication tier can measure a system property when a primary filter element is first installed in the filtration system and can store the system property value as a baseline value.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which:

FIG. 6C is a schematic view of operational substages in accordance with various embodiments herein.

FIG. 15 is a schematic view of components of a system in accordance with various embodiments herein.

FIG. 16 is a schematic view of components of a system in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Various types of data regarding filtration system performance and/or system status can be gathered using sensors. The sensors can be associated with various components of a filtration system or can be remote from the filtration system. The sensors can include, but are not limited to, temperature sensors, pressure sensors, differential pressure sensors, flow sensors, particulate sensors, contaminant sensors, electrical property sensors, geolocation sensors, proximity sensors, sound sensors, vibration sensors, and the like. In some embodiments, data can be generated by another system, such as an engine control unit or module (ECU/ECM) and then can be shared with components of a filtration system. Data generated by other systems can include, but are not limited to, run-time data, engine hours data, fuel consumption data, engine output data, and the like.

In accordance with various embodiments herein, data can be generated at a particular tier or layer of the overall system hierarchy and then passed to other system data communication tiers for processing, storage, calculations, or other operations. In various embodiments, after one or more operations are performed on or using such data, it can be passed onto other data communication tiers either in its original form or in a processed form. In various embodiments, processed data can be passed back to a tier or layer from which sensor data or other input data was originally received. For example, processed data can be sent back to a filter element or external sensor for evaluation, processing, and/or storage.

Figure 1:
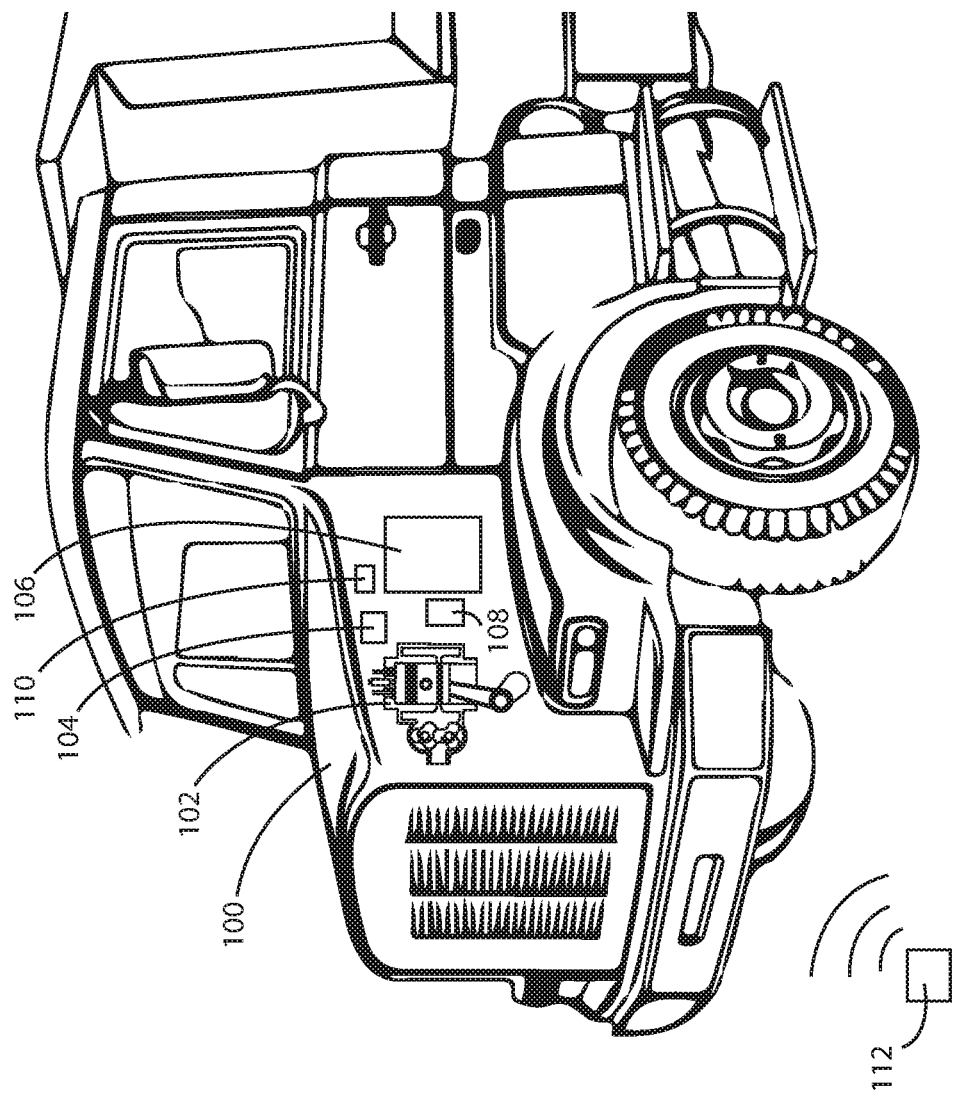
FIG. 1 is a schematic view of components of a filtration system in accordance with various embodiments herein.

Referring now to FIG. 1, a schematic view is shown of components associated with a filtration system in accordance with various embodiments herein. The vehicle 100 is powered by an engine 102 which can be controlled with an engine control unit (ECU) 104. A filtration system 106 is installed on the vehicle 100 and can be in communication with the ECU 104, an on-vehicle (or on-system) reader device 108, one or more external sensors 110, and in some embodiments an off-vehicle reader device 112 or hub. It will be appreciated that for ease of illustration FIG. 1 only shows a limited number of components that can be associated with systems herein and that in various embodiments a greater or lesser number of components can be included.

Figure 2:
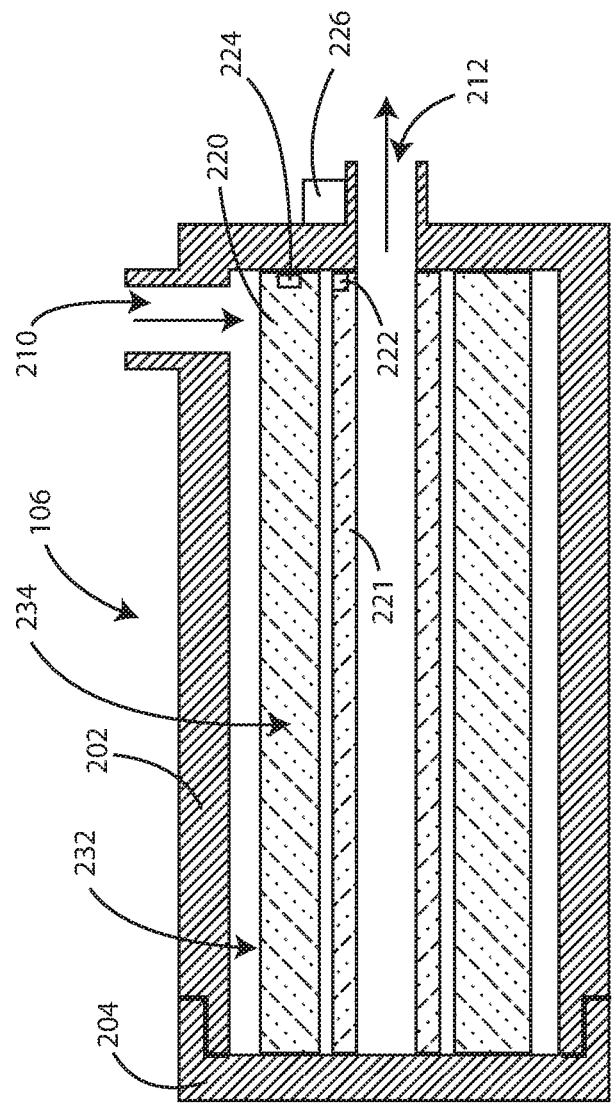
FIG. 2 is a schematic cross-sectional view of a filtration system with a primary filter element and a safety filter element installed therein in accordance with various embodiments herein.

Referring now to FIG. 2, a schematic cross-sectional view of a filtration system 106 with a primary filter element 220 and a safety filter element 221 installed therein in accordance with various embodiments herein. This serves as merely one example of a filtration system and many other types of filtration systems are contemplated herein. With reference to the primary filter element 220, a filter body 232 and filter media 234 disposed within the filter body 232 can be included. However, it will be appreciated that the safety filter element 221, as well as other filter elements can similarly include a filter body and filter media. The filtration system 106 can include a housing 202 comprising a fluid inlet 210 and a fluid outlet 212, the housing defining an internal volume. A primary filter element 220 can be disposed within the internal volume of the housing 202 and can be configured to be removably disposed therein. The proximal end of the internal volume is configured to engage with a removable cover 204 that fits adjacent to the proximal end in order to seal off the proximal end of the housing from the flow of fluid there through. The removable cover 204 can engage the proximal end and remain attached thereto through various devices or structures including threads, friction-fit mechanisms, latches, buckles, snap-fit mechanisms, or the like.

A functional unit 222 such as a sensor unit or a data storage element can be associated with the safety filter element 221. A functional unit 221 such as a sensor unit or a data storage element can also be associated with the primary filter element 220. In some embodiments, a functional unit 226 can also be associated with the filter housing. Various types of sensors and data storage elements are contemplated herein including those referenced above and below.

Figure 3:
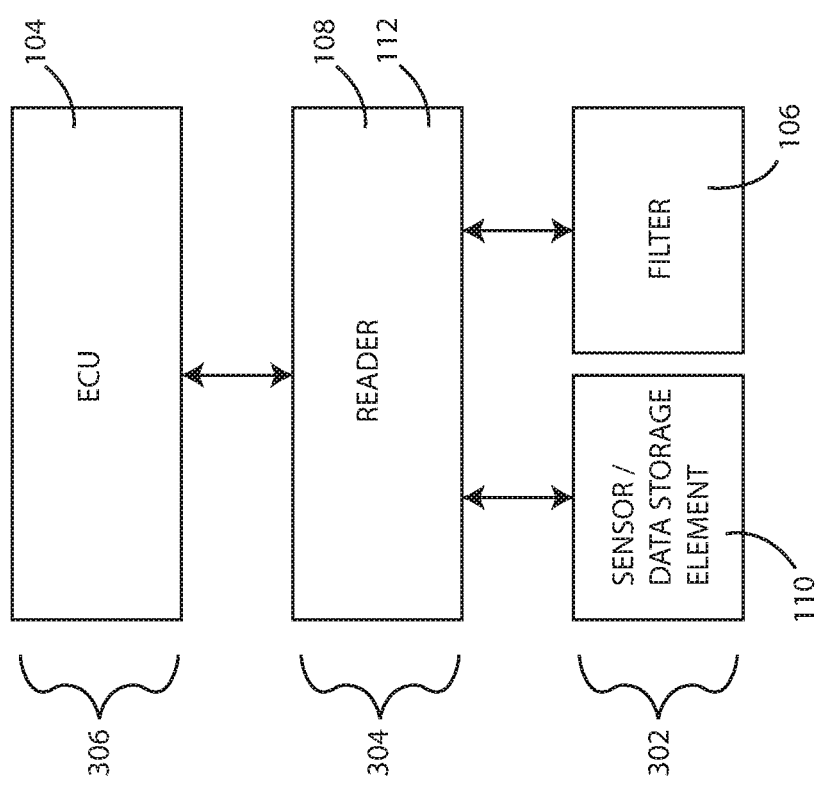
FIG. 3 is a schematic view of data communication tiers associated with a filtration system, and components thereof, in accordance with various embodiments herein.

Referring now to FIG. 3, a schematic view is shown of data communication tiers or layers associated with a filtration system in accordance with various embodiments herein. The first tier 302 includes sensors and data storage elements and can specifically include sensors and data storage elements associated directly with the filtration system 106 (which can be associated with the filter element and/or the filter housing) and any external sensors 110 and data storage elements. The second tier 304 can include a reader device 108, 112 or other components designed to interface directly with components of the first tier 302. The third tier 306 can include elements directly associated with non-filtration systems of the vehicle such as the ECU 104.

Data can move between data communication tiers wirelessly or through direct wired connections. In many cases, data can be transferred in a digital format, however, in some embodiments analog signals can also be transferred between system components.

Figure 4:
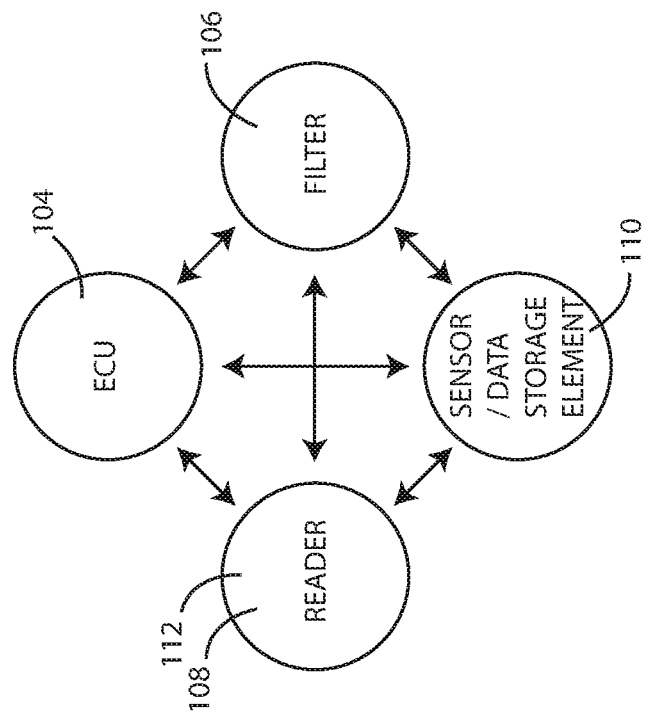
FIG. 4 is a schematic view of components of systems in accordance with various embodiments herein.

While FIG. 3 illustrates the exchange of data directly between the first tier 302 and the second tier 304 and between the second tier 304 and the third tier 306, it will be appreciated that the exchange of data can also take place directly between the first tier 302 and the third tier 306, as well as between components in the same tier, such as between the filtration system 106 (or components thereof) and an external sensor 110. Referring now to FIG. 4, a schematic view of components of systems in accordance with various embodiments herein. A filtration system 106 can exchange data with an ECU 104, a reader (on-vehicle 108 or off-vehicle 112), and a sensor 110. Similarly, the ECU 104 can exchange data with a filtration system 106, a reader 108 or 112, and a sensor 110. Further, the reader 108 can exchange data with an ECU 104, a filtration system 106, and an external sensor 110. Finally, the external sensor 110 can exchange data with an ECU 104, a filtration system 106, and a reader 108 or 112.

Figure 5:
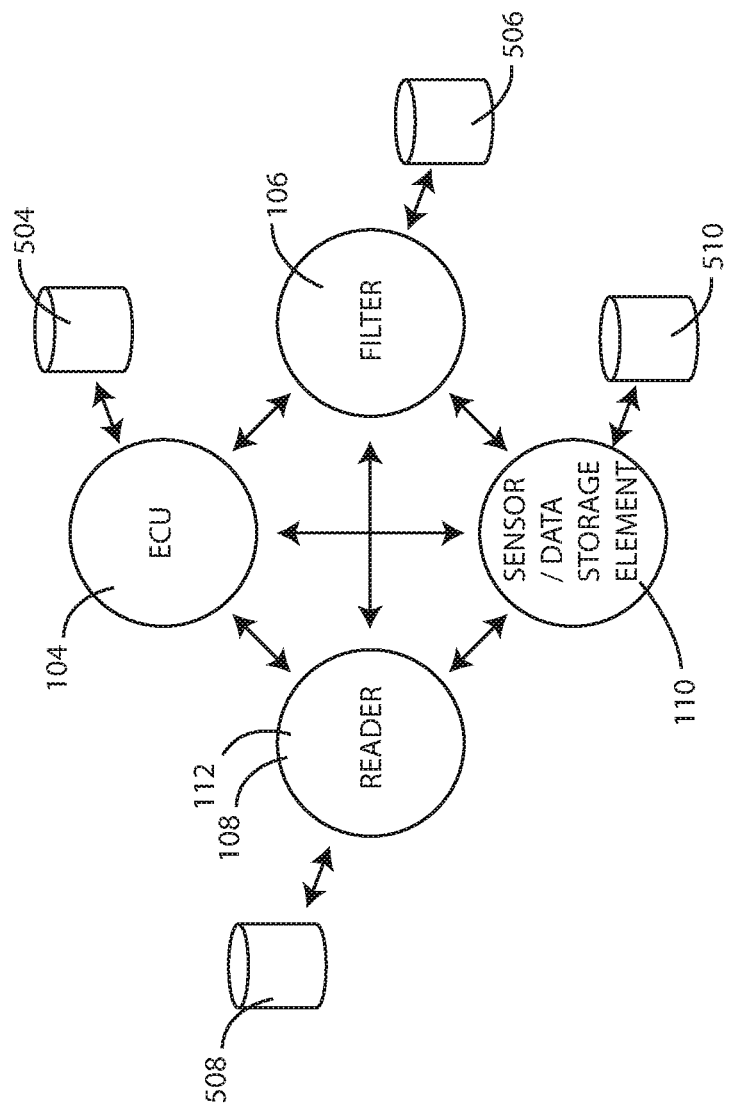
FIG. 5 is a schematic view of components of systems in accordance with various embodiments herein.

Data can be stored with multiple components of the system. Referring now to FIG. 5, a schematic view of components of systems in accordance with various embodiments herein is shown. The ECU 104 can include a data store 504. The filtration system 106 can include a data store 506. In various embodiments, the filtration system 106 can include a filter element, which itself can include a data storage element. The reader 108, 112 can include a data store 508. Further, the external sensor 110 can include a data store 510.

The data stores and data storage elements can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected so as to provide positive feedback operating as latches or flip flops, providing for circuits that have two or more metastable states, and remain in one of these states until changed by an external input. Data storage can be based on such flip-flop containing circuits. Data storage can also be based on the storage of charge in a capacitor or on other principles.

Operational Stages

Data exchange between data communication tiers and components thereof can take place at various times with respect to the operational stages/states of vehicles into which filtrations systems can be installed. In some embodiments, data exchange of certain types of data and between certain data communication tiers and/or components within data communication tiers, can be initiated by the start or stop of a particular operational stage. In some embodiments, data processing operations can be triggered by the start or stop of a particular operational stage. In some embodiments, the start or stop of operational stages or substages can be stored along with a date/time stamp. In some embodiments, the start or stop of operational stages can be initiate an "alert" or other communication to be generated between data communication tiers and/or between components within a tier, or to outside components, reflecting the operational stage or substage or aspects thereof. In some embodiments, an input can be received by one or more data tiers that indicates whether a stage or substage has started and/or stopped or what stage the vehicle or engine is currently in. By way of example, data can be sent from an ECU or other vehicle control system that identifies the present stage or substage and/or the start or stop of a stage or substage. In some embodiments, the system herein or components thereof can use data inputs such as data inputs from sensors to determine or sense the present stage or substage and/or the start or stop of a stage or substage. Various examples of this are described in greater detail below.

Figure 6A:
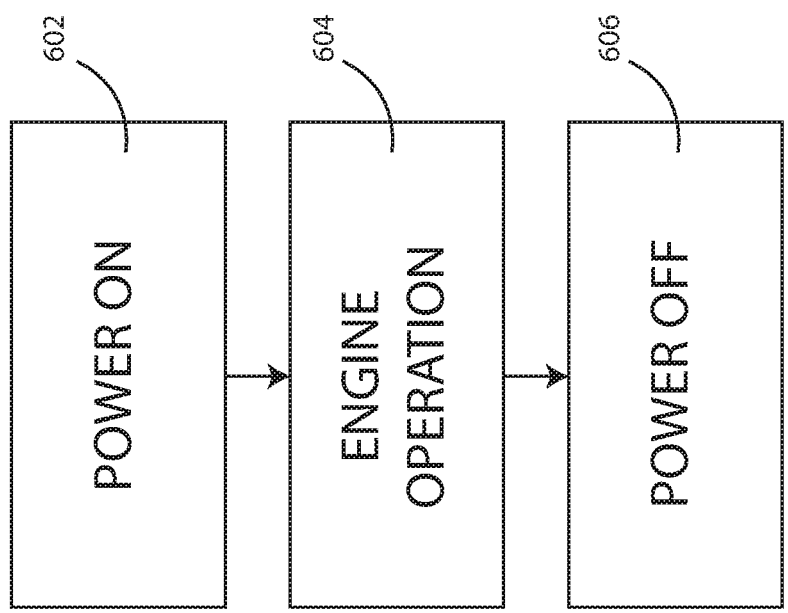
FIG. 6A is a schematic view of operational stages in accordance with various embodiments herein.

FIG. 6A is a schematic view of some engine/vehicle operational stages in accordance with various embodiments herein. A first operational stage is a "power on" stage 602. In some embodiments, the beginning of the "power on" stage 602 can be marked and/or logged by detecting a power input from an engine/vehicle or vehicle. A second operational stage is an "engine operation" stage 604. In the "engine operation" stage 604, the engine is started, running and consuming fuel, air, and emitting exhaust. In the "engine operation" stage 604, the engine speed can vary and therefore the amount of fuel and air consumed and exhaust emitted can vary. A third operational stage is a "power off" stage 606. In the "power off" stage 606 operation of the engine ceases.

In various embodiments, the start or end of a particular stage (or one or more substages described below) can trigger the transfer of data between or within data communication tiers as described herein. By way of example, in some embodiments, certain types of data are transferred from the first tier 302 onto the second tier 304 and/or third tier 306 after the start of the "power on" stage 602. For example, data such as model identification data, product serial number, product specifications/capacities data, manufacturer identification data, terminal pressure drop associated with a model identification data, and threshold or maximum values for pressure drop data can be transferred from the first tier 302 onto the second tier 304 and/or third tier 306 after the start of the "power on" stage 602. Similarly, certain types of data can be transferred from the second tier 304 and/or the third tier 306 to the first tier 302 after the start of the "power off" stage 606. For example, data such as run-time data, engine hours data, fuel consumption data, engine output data can be transferred from the second tier 304 and/or the third tier 306 to the first tier 302 after the start of the "power off" stage 606.

In some embodiments, a product serial number that uniquely identifies a particular filter element (in some cases along with other information) is transferred from the first tier 302 onto the second tier 304 and/or third tier 306 (or between components in the first tier 302) after the start of the "power on" stage 602. This information can be stored by one or more components and then each time another product serial number is received it can be checked against records to determine if this represents a new product serial number (and therefore a new replaceable filter element in this example). If it does represent a new product serial number, then a time/date stamp can be stored as a "first seen" or "first installed" date. A record of all unique product serial numbers representing components that are part of or installed in the system can be maintained in the data stores of one or more system components and at one or more tiers of the system.

In some embodiments, stored information regarding previous filter elements (including, but not limited to, product serial number, model ID, manufacturer ID, manufacturing plant ID, replacement intervals, performance history, or any of the other types of data referenced herein) that have been "seen by" or "installed in" the filtration system or vehicle can be transferred to the filter element and stored therein such that each filter element that has been installed at least once includes a record of all previous filter elements that were installed in the same filtration system and/or same vehicle. In this manner, a filtration system history can be carried by each filter element after it has been installed at least once. In a vehicle/equipment fleet scenario, filter elements may periodically get removed for cleaning and then reinstalled, but not necessarily in the same vehicle or piece of equipment. As such, a given filter element may end up storing a filtration system history for more than one vehicle or piece of equipment if it has been installed on more than one vehicle or piece of equipment. Similarly, a given filter element can store a record of all the vehicles or pieces of equipment (by ID number or other identifier and/or type information, etc.) it has been installed on during its working life.

Figure 6B:
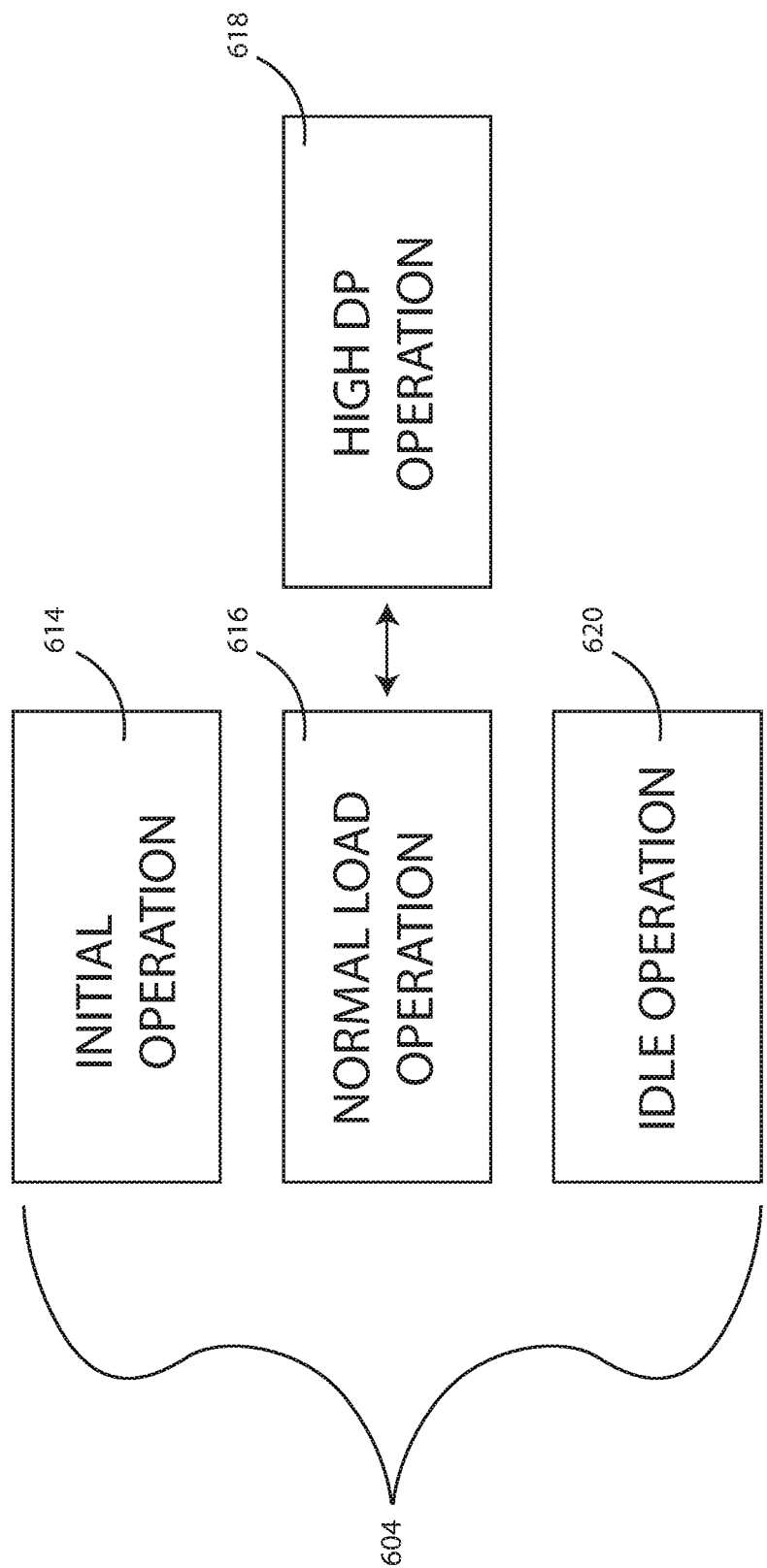
FIG. 6B is a schematic view of operational substages in accordance with various embodiments herein.

The engine/vehicle operational stages of FIG. 6A can further include various substages in some embodiments. Referring now to FIG. 6B, a schematic view is shown of some substages of an engine operation stage 604 in accordance with various embodiments herein. At the beginning of the engine operation stage 604, the engine is started and, in the case of an air filter, air starts to move through the filtration system. The engine operation stage 604 can include an initial operation substage 614. During the initial operation substage 614, airflow can be limited due to low engine RPM and/or load. However, in some embodiments, the engine RPM may initially be relatively high and include relatively high airflow as a part of a startup/warmup sequence before falling to an idle RPM. The engine may also be warming up during the initial operation substage 614.

In some embodiments, the beginning of the initial operation substage 614 can be marked and/or logged by detecting an increase in airflow from 0 cfm to greater than 0 cfm. In some embodiments, the beginning of the initial operation substage 614 can be marked and/or logged by detecting an increase in pressure drop across a filter element from 0 (such as when there is no air flowing) to greater than 0 psi. In some embodiments, the beginning of the initial operation substage 614 can be marked and/or logged by detecting a signal from an ECU or other engine/vehicle control system. In some embodiments, the beginning of the initial operation substage 614 can be marked and/or logged by detecting a pattern related to airflow, vibration, electrical signals, and/or engine RPM consistent with a known start-up sequence.

In various embodiments, the start or end of the initial operation substage 614 can initiate the transfer of data between or within data communication tiers as described herein.

The engine operation stage 604 can also include a normal load operation substage 616. During the normal load operation substage 616, airflow can change based on the instantaneous load on the engine and/or operating speed.

In some embodiments, the beginning of the normal load operation substage 616 can be marked and/or logged by detecting an increase in airflow above a threshold value for a threshold period of time, which can be reflective of an amount characteristic of engine use under load. In some embodiments, the beginning of the normal load operation substage 616 can be marked and/or logged by detecting an increase in pressure drop across a filter element above a threshold value, which can be reflective of an amount characteristic of engine use under load. In some embodiments, the beginning of a normal load operation substage 616 can be marked and/or logged by detecting non-zero airflow or pressure drop in combination with another piece of information such as detecting movement with a movement sensor such as an accelerometer or a locating circuit such as a GPS circuit or similar circuit providing a geolocation value.

The engine operation stage 604 can also include a high delta P (pressure drop) operation substage 618. The high delta P operation substage 618, can be marked and/or logged when a pressure drop exceeds a threshold value indicating a filter element with heavy loading in combination with machine operation at high flow. The threshold value can be dependent on the model ID of the particular filter element in question. In various embodiments, a date/time stamp can be stored on any of the system components described herein indicating when a high delta P operation substage is entered and/or exited along with, in some embodiments, duration values and/or the serial number of a filter element being used at the start of or during the high delta P operation substage.

The engine operation stage 604 can also include an idle operation substage 620. During the idle operation substage 620, the engine may be fully warmed up but not under load and therefore the airflow, on average, can be less than during the normal load operation substage 616. As such, the beginning of an idle operation substage 620 can be marked and/or logged by detecting a decrease in average airflow below a threshold value but still greater than zero. In practice, the engine may alternate between normal load operation and idle operation many times. In some embodiments, the beginning of the idle operation substage 620 can be marked and/or logged by detecting a decrease in average pressure drop across a filter element below a threshold value but still greater than zero. In some embodiments, the beginning of an idle operation substage 620 can be marked and/or logged by detecting reduced airflow or pressure drop in combination with another piece of information such as detecting a cessation in movement with a movement sensor such as an accelerometer or a locating circuit such as a GPS circuit or similar circuit providing a geolocation value.

Entering an idle operation substage 620 can be used to initiate the transfer of data between or within data communication tiers. In many cases, idling of a motor or vehicle will precede a power off stage 606. As such, in some embodiments, entering an idle operation substage 620 can be used to initiate the transfer of data between or within data communication tiers as described below with respect to a power off stage 606 (or substages thereof).

Referring now to FIG. 6C, a schematic view is shown of some substages of a power off stage 606. The power off stage 606 can include an initial operation cessation substage 626. During the initial operation cessation substage 626, airflow may suddenly cease and/or power from the vehicle may suddenly cease. In various circumstances, there can still be an opportunity to transfer data between or within data communication tiers either before power ceases or using power stored in a battery or a capacitor.

In some embodiments, the start of an initial operation cessation substage 626 can be marked and/or logged by the detection of airflow cessation. The start of an initial operation cessation substage 626 can initiate the transfer of data between or within data communication tiers as described herein. In some embodiments, information that uniquely identifies the filtration system and/or the vehicle into which the filter element is installed can be transferred. In some embodiments, this information can be transferred to and stored by the filter element along with a time/date stamp. In some embodiments, an event flag corresponding to the occurrence of the power off stage 606 or one or more power off substages can be transferred. In some embodiments, one or more other pieces of data (such as one or more of those described herein) can also be transferred to and stored by the filter element.

The power off stage 606 can also include a cover off substage 628. The cover off substage 628 can be marked and/or logged by the detection of a filtration system cover being removed. In some embodiments, the filtration system can include a cover switch that can be actuated to provide a signal indicating that the cover has been removed. In some embodiments, detection of cover removal can initiate the transfer of data between or within data communication tiers as described herein. In some embodiments, detection of cover removal can initiate the transfer of data to the filter element from other components in the same or different tiers in anticipation that the filter element will shortly be removed.

The power off stage 606 can also include a filter element removal substage 630. The filter element removal substage 630 can be marked and/or logged by detecting of a filter element being removed from a filter system housing. In some embodiments, a filter element removal substage 630 can be marked and/or logged by a sudden and sustained (for greater than a threshold amount of time) loss of communication (wired or wireless) with a filter element. In some embodiments, an event flag corresponding to the occurrence of the filter element removal substage 630 can be stored by one or more components at one or more of the tiers described herein.

In some embodiments, the conditions observed immediately after a filter element is replaced can be measured and stored and then used to determine other information about the operating status of a filtration system or components thereof. For example, in a filtration system including a primary filter element and a secondary (or safety) filter element, it is common that the primary filter element is replaced/serviced at a much shorter interval than the secondary or safety filter element. Thus, when a new primary filter element is first installed it is common that the secondary or safety element has already been in use and may already have some degree of loading.

Measuring the initial operating conditions (pressure drop, etc.) can provide an ability to assess the state of the secondary or safety element. Generally, the higher the pressure drop (restriction) observed initially after a new primary filter element is installed, the greater the loading on the secondary or safety element and therefore the less life it has left. As such, measuring the pressure drop after a new primary filter element is installed can allow the system to provide an end of life estimation that is specific for the secondary or safety filter element.

It will be appreciated that there are various techniques for performing such end of life estimations. In one approach, a loading curve (relating a degree of restriction versus a value reflective of the magnitude of use of the filter element such as hours of use) or loading coefficients specific for the model ID of the filter element can be used to estimate when a filter element will reach a threshold value of loading based on the current degree of restriction and how many hours of use it took to reach that degree of restriction. By using a degree of restriction measured when a primary filter element is first installed, and subtracting out a known contribution to measured restriction provided by a new primary filter element, a level of restriction provided solely by the secondary or safety filter can be derived and then an estimation of end of life for the secondary or safety filter can be derived using a loading curve or loading coefficients specific for the secondary or safety filter.

In addition, since a total pressure drop through the filter elements reflects contributions from both the primary and the secondary or safety elements, knowing the starting condition of the secondary or safety element provides an ability to more accurately track loading of the primary filter element and therefor provide a more accurate end of life estimation for the primary filter element. For example, the contribution to total restriction provided by the secondary or safety filter can be estimated and then be subtracted to arrive at a more accurate measurement of restrictions for the primary filter element. Beyond end of life estimates, other estimations regarding the primary and/or secondary or safety filter element that can be performed herein can include, but are not limited to, estimations of time or usage (miles) until a threshold restriction (pressure drop) value is reached or calculations on economically optimal replacement intervals.

Accordingly, in various embodiments herein, the system can measure the pressure drop after a new primary filter element is installed and store this value. Then this value can be used in a calculation to estimate the condition and/or calculate an end of life value for the secondary or safety filter element. This value can also be used during calculations performed during ongoing operation to calculate the condition and/or calculate an end of life value for the primary filter element while correcting for the contribution to restriction provided by the secondary or safety filter element.

Additional Data Transfer/Processing Sequences

Figure 7:
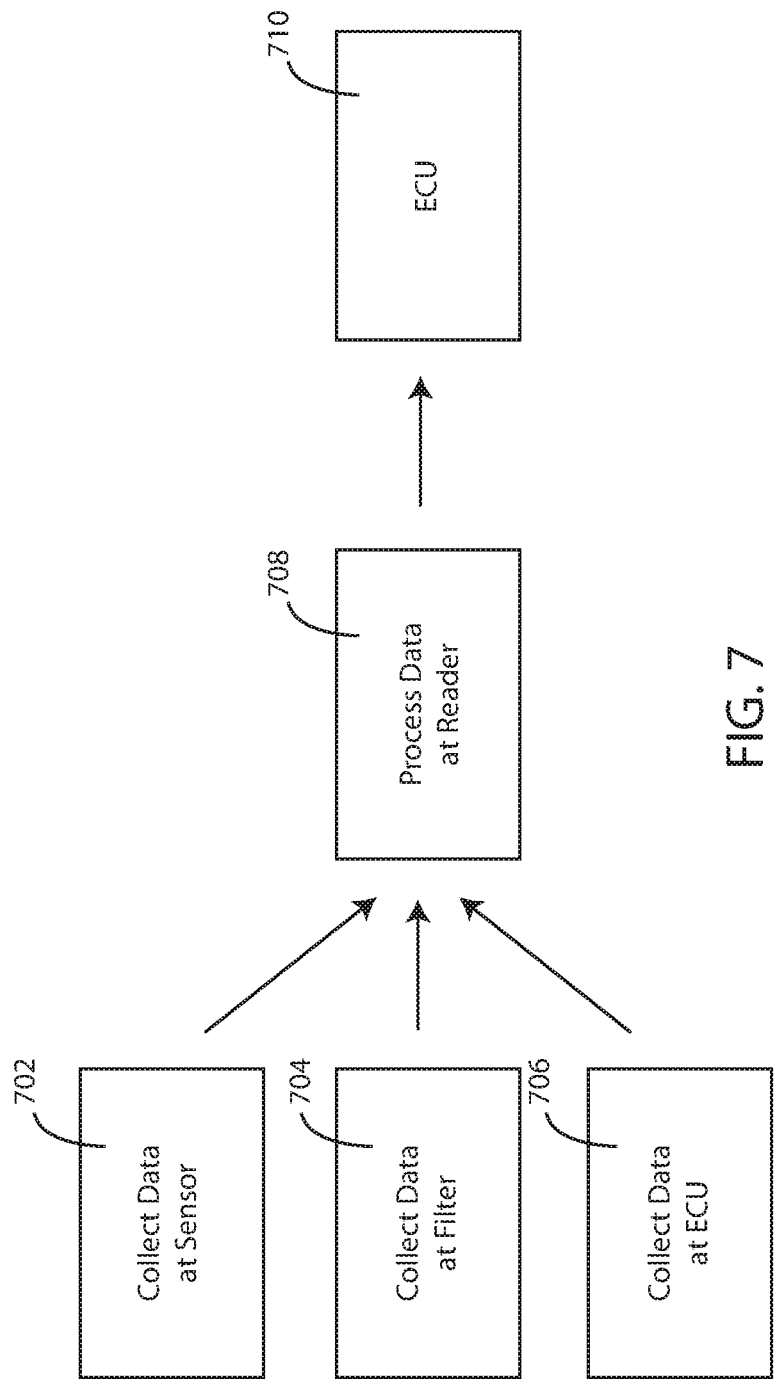
FIG. 7 is a schematic view data transfer between tiers associated with a filtration system in accordance with various embodiments herein.

In some embodiments, data can be transferred to and then processed at the second tier 304, such as at the reader device 108, 112. Referring now to FIG. 7, a schematic view of data transfer between data communication tiers associated with a filtration system is shown in accordance with various embodiments herein. Data can be collected 702 by an external sensor. Data can also be collected 704 by a filtration system. Data can also be collected 706 by the ECU. Data, as collected by the external sensor, the filtration system, and the ECU can be transferred to the reader (on-vehicle or off-vehicle such as a hub) and can then be processed 708 by the reader. Exemplary data processing operations are described in greater detail below and can result in processed data. The resulting processed data can then be transferred to the ECU.

Figure 8:
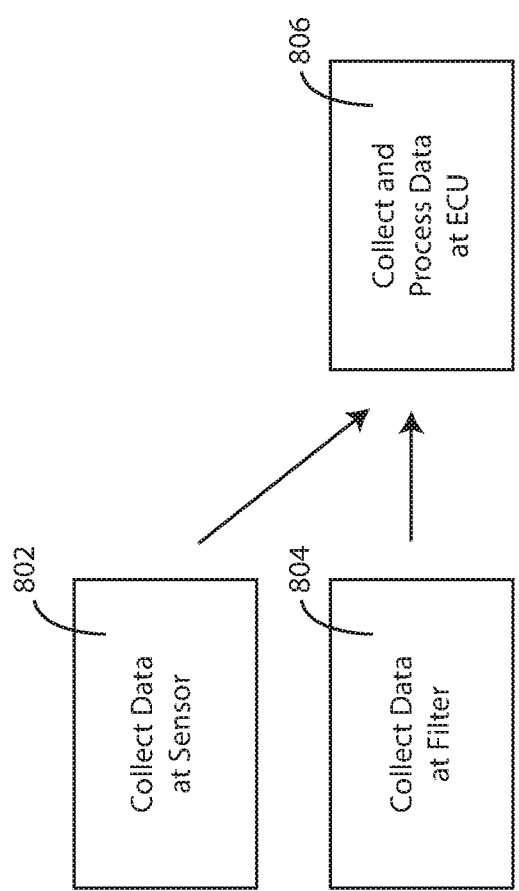
FIG. 8 is a schematic view of data transfer between data communication tiers associated with a filtration system in accordance with various embodiments herein.

In some embodiments, data from the sensor(s) and/or filter(s) can be transferred directly to and then processed at the third tier 306, such as at the ECU 104. Referring now to FIG. 8, a schematic view of data transfer between data communication tiers associated with a filtration system is shown in accordance with various embodiments herein. Data can be collected 802 by an external sensor. Data can also be collected 804 by a filtration system. Data, as collected by the external sensor and the filtration system can then be transferred to the ECU and can then be processed 806 by the ECU.

Figure 9:
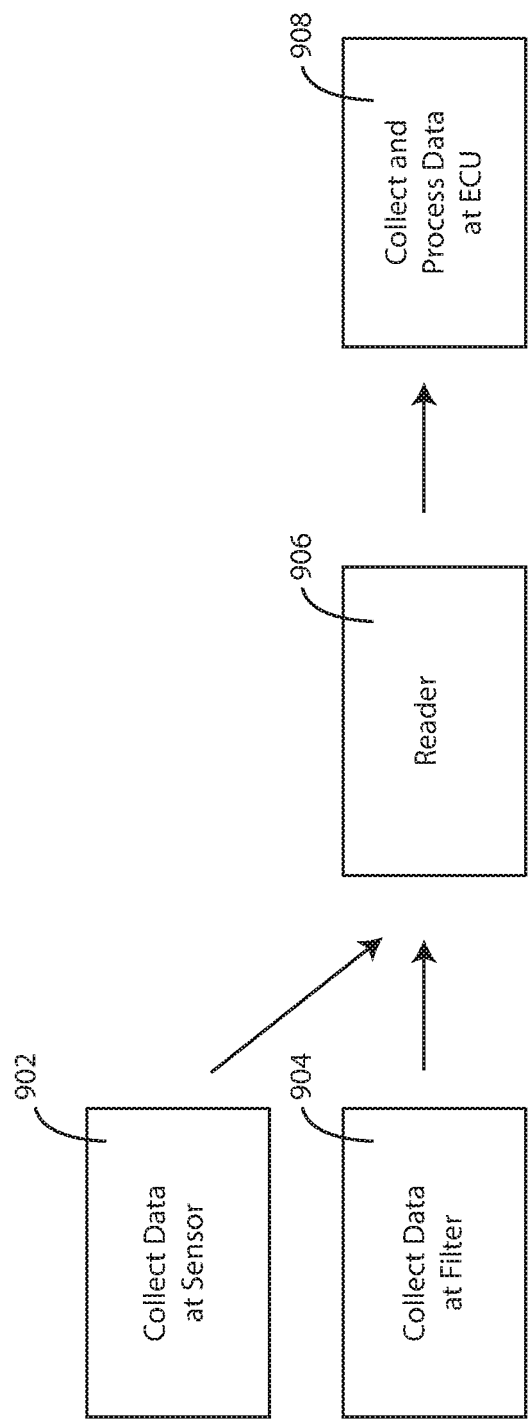
FIG. 9 is a schematic view of data transfer between data communication tiers associated with a filtration system in accordance with various embodiments herein.

In some embodiments, data can be collected by the first tier 302 and then transferred to the second tier, such as the reader (on-vehicle or off-vehicle such as a hub), and then transferred to and processed at the third tier 306, such as at the ECU 104. Referring now to FIG. 9, a schematic view of data transfer between data communication tiers associated with a filtration system is shown in accordance with various embodiments herein. Data can be collected 902 by an external sensor. Data can also be collected 904 by a filtration system. The data collected by the first tier can then be transferred 906 to the second tier, such as to a reader (on-vehicle or off-vehicle such as a hub). The data can then be transferred to the ECU and can then be processed 908 by the ECU.

Figure 10:
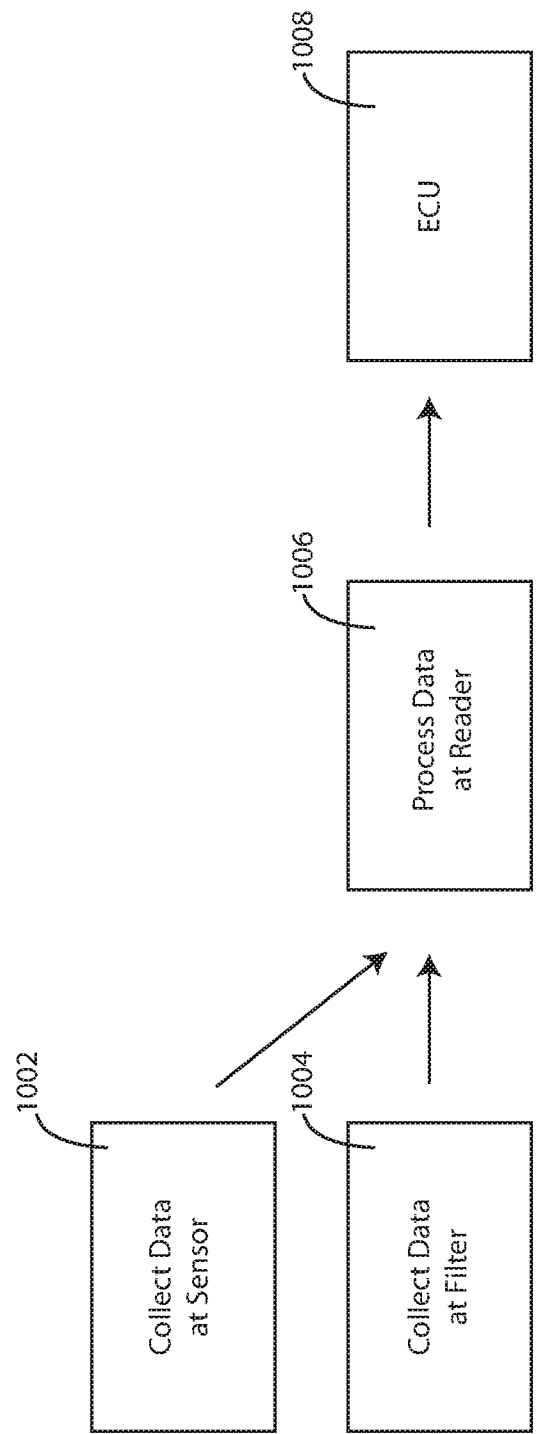
FIG. 10 is a schematic view of data transfer between data communication tiers associated with a filtration system in accordance with various embodiments herein.

In some embodiments, data can be collected by the first 302 and then transferred to the second tier, such as the reader (on-vehicle or off-vehicle such as a hub), and processed at the second tier 304. The processed data can then be transferred to the third tier 306, such as at the ECU 104. Referring now to FIG. 10, a schematic view of data transfer between data communication tiers associated with a filtration system is shown in accordance with various embodiments herein. Data can be collected 1002 by an external sensor. Data can also be collected 1004 by a filtration system. The data collected by the first tier can then be transferred to and processed 1006 by the second tier, such as the reader (on-vehicle or off-vehicle such as a hub). Finally, the processed data can then be transferred 1008 to the ECU.

Figure 11:
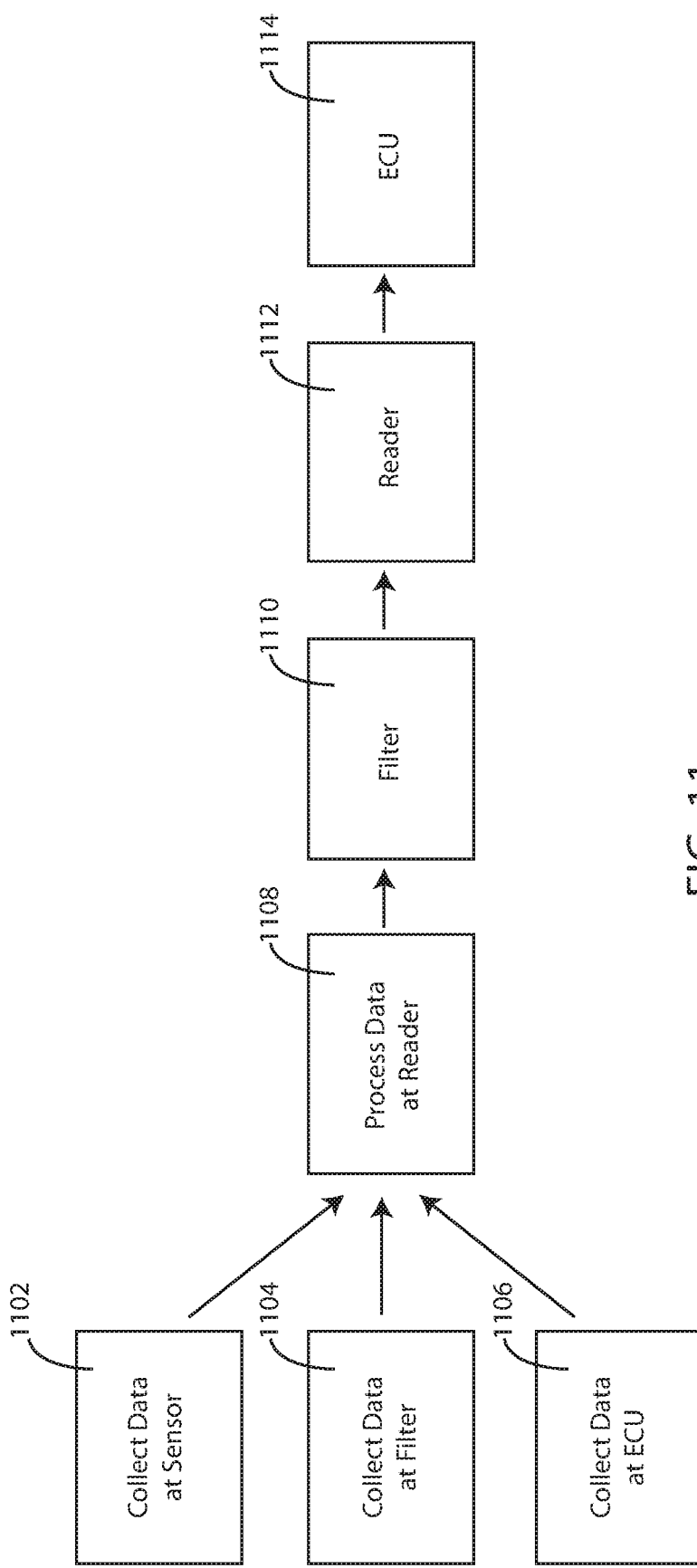
FIG. 11 is a schematic view of data transfer between data communication tiers associated with a filtration system in accordance with various embodiments herein.

In some embodiments, data can be transferred to and then processed at the second tier 304, such as at the reader device 108, 112 and then passed back to the first tier 302 and on to the third tier 306. Referring now to FIG. 11, a schematic view of data transfer between data communication tiers associated with a filtration system is shown in accordance with various embodiments herein. Data can be collected 1102 by an external sensor. Data can also be collected 1104 by a filtration system. Data can also be collected 1106 by the ECU. Data, as collected by the external sensor, the filtration system, and the ECU can be transferred to the reader (on-vehicle or off-vehicle such as a hub) and can then be processed 1108 by the reader. The resulting processed data can then be transferred 1110 to the first tier 302, such as the filtration system. The resulting processed data can also be transferred 1112 from the reader (on-vehicle or off-vehicle such as a hub) and be received 1114 by the ECU and, in some cases, the processed data can specifically be transferred from the first tier 302 to the second tier 304 and then to the ECU.

Figure 12:
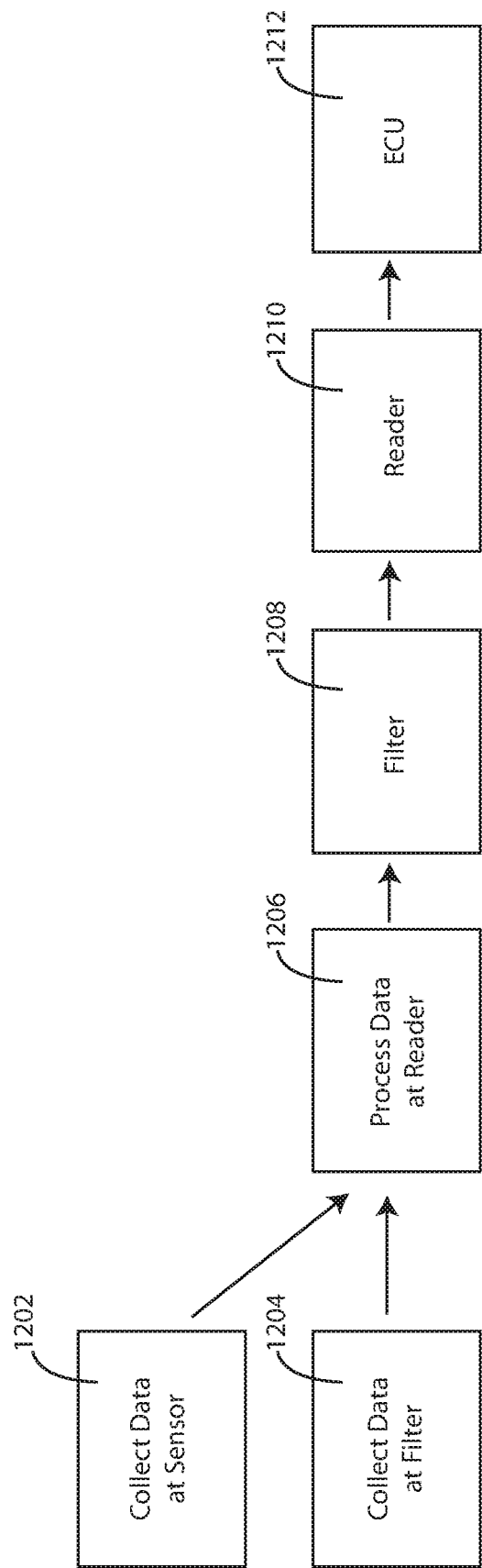
FIG. 12 is a schematic view of data transfer between data communication tiers associated with a filtration system in accordance with various embodiments herein.

Referring now to FIG. 12, a schematic view of data transfer between data communication tiers associated with a filtration system is shown in accordance with various embodiments herein. Data can be collected 1202 by an external sensor. Data can also be collected 1204 by a filtration system. Data, as collected by the external sensor, the filtration system, and the ECU can be transferred to the reader (on-vehicle or off-vehicle such as a hub) and can then be processed 1206 by the reader. The resulting processed data can then be transferred 1208 to the first tier 302, such as the filtration system. The resulting processed data can also be transferred 1210 from the reader (on-vehicle or off-vehicle such as a hub) and be received 1212 by the ECU and, in some cases, the processed data can specifically be transferred from the first tier 302 to the second tier 304 and then to the ECU.

Figure 13:
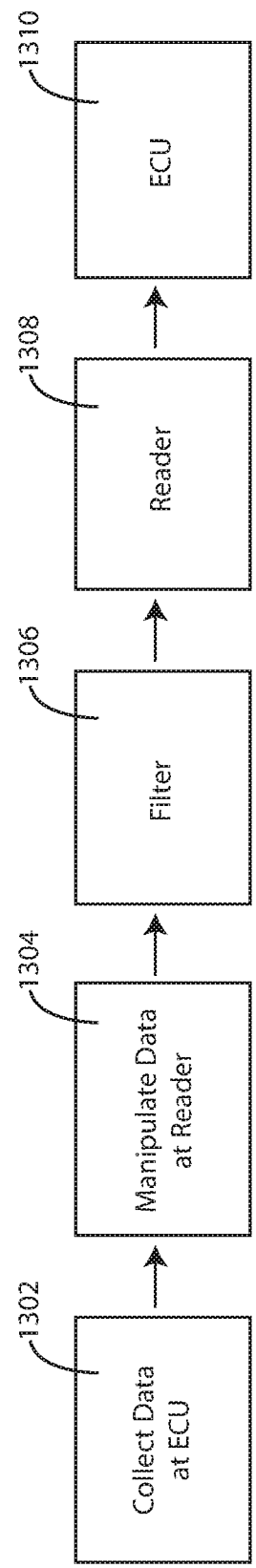
FIG. 13 is a schematic view of data transfer between data communication tiers associated with a filtration system in accordance with various embodiments herein.

Referring now to FIG. 13, a schematic view of data transfer between data communication tiers associated with a filtration system is shown in accordance with various embodiments herein. Data can be collected 1302 by an ECU. Data, as collected by the ECU can be transferred to the reader (on-vehicle or off-vehicle such as a hub) and can then be processed 1304 by the reader. The resulting processed data can then be transferred 1306 to the first tier 302, such as the filtration system. The resulting processed data can also be transferred 1308 from the reader and be received 1310 by the ECU.

Figure 14:
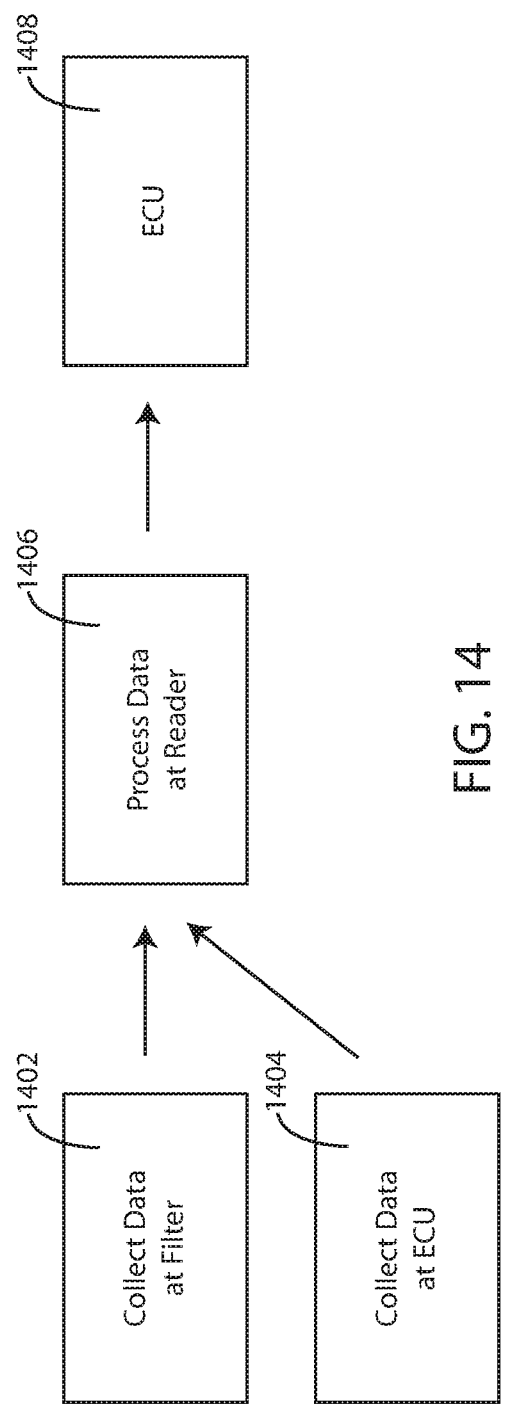
FIG. 14 is a schematic view of data transfer between data communication tiers associated with a filtration system in accordance with various embodiments herein.

Referring now to FIG. 14, a schematic view of data transfer between data communication tiers associated with a filtration system is shown in accordance with various embodiments herein. Data can be collected 1402 by a filtration system. Data can also be collected 1404 by an ECU. The data collected by the first tier can then be transferred to and processed 1406 by the second tier, such as the reader (on-vehicle or off-vehicle such as a hub). Finally, the processed data can then be transferred 1408 to the ECU.

Data Content

Data herein can include sensor data including, but not limited to, data from temperature sensors, pressure sensors, differential pressure sensors, flow sensors, particulate sensors, contaminant sensors, electrical property sensors, geolocation sensors, sound sensors, vibration sensors, and the like.

Data herein can also include data regarding one or more components of the system including, but not limited to, product model identification, product serial number, product specifications/capacities, manufacturer identification, manufacturing plant identification, manufacturing date, terminal pressure drop associated with a model identification, threshold or maximum values for pressure drop, filter element loading curves, filter element loading coefficients, system component manufacturing data, software updates, firmware updates, algorithm information (such as end-of-life prediction, regeneration prediction/initiation, performance calculation/tracking), data representing the output of algorithms, data regarding versions of software/firmware/algorithm updates including dates and versions, fuel cost data, fuel formulation data, emissions regulation data, cost of filter elements, labor cost to change filter element, data revision date, typical fuel consumption rates for particular machines, fuel usage penalty factors for operating with increase pressure drop for a machine associated with a particular filtration system or filtration system component model ID, run-time data, engine hours data, fuel consumption data, engine output data, and the like. In some embodiments, data herein can include messages or warnings regarding system status or performance such as maximum or threshold pressure drop exceeded, end-of-life (EOL) reached or within a threshold amount of being reached, maximum or threshold particulate passage exceeded, safe operating reserve capacity maximum or threshold exceeded, improper components (such as filter elements) detected, non-genuine components (such as filter elements) detected, and the like.

Data Processing Operations

Data processing operations herein can include various operations including, but not limited to, averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting EOL, identifying an EOL condition, predicting performance, predicting costs associated with replacing filter elements vs. not-replacing filter elements, and the like. Normalizing can include, but is not limited to, adjusting one or more values based on another value or set of values. As just one example, pressure drop data reflective of pressure drop across a filter element can normalized by accounting for air flow.

Circuitry of Components

Circuitry associated with systems herein can include various specific electronic components in order to execute operations as described herein. Referring now to FIG. 15, a schematic view is shown of some components of a system in accordance with various embodiments herein. In particular, FIG. 15 shows components of a first system element 1544 in communication with a second system element 1546. In particular, the first system element 1544 can be part of a filtration system, filter element, filter housing, sensor or another type of system component. The second system element 1546 can be part of a reader device (on-vehicle or off-vehicle), filtration system, filter housing, or another type of system component.

Components associated with a first system element 1544 can include one or more of an antenna 1510, a power supply circuit 1512 (which can include one or more of a battery, a capacitor, a power-receiver such as a wireless power receiver), a processing circuit 1502 (which can include a processor, a microcontroller, an ASIC, or the like), a memory storage circuit 1504 (which can include volatile or non-volatile electronic memory), a communication circuit 1506, and a cryptographic circuit 1508 (which can include a specialized cryptographic processor and/or data associated with cryptographic functions). In some embodiments herein, a wireless power receiver can include an LC circuit. In some embodiments, the wireless power receiver can include an RF power receiver. In some embodiments, one or more components of a power supply circuit, such as a wireless power receiver, can be disposed on or in the filter body.

It will be appreciated that in some embodiments a first system element 1544 may not include all of the components shown and described with respect to FIG. 15. In addition, in some embodiments first system element 1544 may include additional components beyond what is shown and described with respect to FIG. 15.

Components associated with a second system element 1546 can include one or more of an antenna 1522, a power supply circuit 1524 (which can include one or more of a battery, a capacitor, or a power-receiver), a processing circuit 1526 (which can include a processor, a microcontroller, an ASIC, or the like), a memory storage circuit 1528 (which can include volatile or non-volatile memory), a communication circuit 1530, a cryptographic circuit 1532 (which can include a specialized cryptographic processor and/or data associated with cryptographic functions), a clock circuit 1534, and a location circuit 1536.

In some embodiments, communication between components of a system can be conducted wirelessly. However, in other embodiments, communication between components of a system can be conducted through a wired connection. Referring now to FIG. 16, a schematic view is shown of components of a system in accordance with various embodiments herein.

Components associated with a first system element 1544 can include one or more of a processing circuit 1502 (which can include a processor, a microcontroller, an ASIC, or the like), a memory storage circuit 1504 (which can include volatile or non-volatile electronic memory), a communication circuit 1506, and a cryptographic circuit 1508 (which can include a specialized cryptographic processor and/or data associated with cryptographic functions). Power can be provided from a power supply 1606 that is external to the first system element (and could be from a vehicle or another source). The first system element 1544 can be connected to the power supply via electrical contacts 1602. As represented in FIG. 16, the power supply 1606 is a DC power source, but AC power sources are also contemplated herein. It will be appreciated that in some embodiments a first system element 1544 may not include all of the components shown and described with respect to FIG. 16. In addition, in some embodiments first system element 1544 may include additional components beyond what is shown and described with respect to FIG. 16.

Components associated with a second system element 1546 can include one or more of a processing circuit 1526 (which can include a processor, a microcontroller, an ASIC, or the like), a memory storage circuit 1528 (which can include volatile or non-volatile memory), a communication circuit 1530, a cryptographic circuit 1532 (which can include a specialized cryptographic processor and/or data associated with cryptographic functions), a clock circuit 1534, and a location circuit 1536. Power can be provided from a power supply 1606 that is external to the data storage element (and could be from a vehicle or another source). The second system element 1546 can be connected to the first system element 1544 (such as when the filter element is installed in a filter housing) via wires 1604.

Aspects have been described with reference to various specific and preferred embodiments and techniques. However, it should be understood that many variations and modifications may be made while remaining within the spirit and scope herein. As such, the embodiments described herein are not intended to be exhaustive or to limit the invention to the precise forms disclosed in the following detailed description. Rather, the embodiments are chosen and described so that others skilled in the art can appreciate and understand the principles and practices.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A filtration system with multitiered data exchange capabilities comprising:
   a first data communication tier comprising
      a filter element, the filter element comprising a data storage element for storing data; and
      a first sensor associated with the filter element;
   a filter element housing configured to removably receive the filter element, wherein the filter element is configured to be removed from the filter element housing and replaced with a second filter element;
   a second data communication tier comprising
      a reader device in communication with at least one of the filter element and the first sensor; and
   a third data communication tier comprising
      an engine control unit (ECU) in communication with the reader device, wherein the ECU stores data;
   wherein the second data communication tier receives data from the first data communication tier and the third data communication tier;
   wherein the second data communication tier executes operations on the received data to create a processed data set;
   wherein the second data communication tier sends the processed data set to the data storage element of the filter element;
   wherein the second data communication tier sends the processed data set to the third data communication tier;
   wherein the filtration system is configured to detect a power on stage, and upon detecting the power on stage, the first data communication tier is configured to send data regarding a unique identifier of the filter element to the second data communication tier and/or the third data communication tier;
   wherein the second data communication tier and/or the third data communication tier is configured to:
      store the unique identifier of the filter element;

compare the unique identifier of the filter element to one or more previously stored unique identifiers; and if the unique identifier of the filter element does not match the previously stored unique identifiers, record an indication that a new filter element has been installed along with a timestamp.

2. The filtration system with multitiered data exchange capabilities of claim 1, wherein the processed data set include information regarding an expected end-of-life for the filter element or a portion thereof.

3. The filtration system with multitiered data exchange capabilities of claim 1, wherein the processed data set include information regarding percent life remaining for the filter element or a portion thereof.

4. The filtration system with multitiered data exchange capabilities of claim 1, wherein the processed data set include information regarding percent life consumed for the filter element or a portion thereof.

5. The filtration system with multitiered data exchange capabilities of claim 1, wherein the processed data set include information regarding miles remaining for the filter element or a portion thereof.

6. The filtration system with multitiered data exchange capabilities of claim 1, wherein the processed data set include information regarding hours remaining for the filter element or a portion thereof.

7. The filtration system with multitiered data exchange capabilities of claim 1, wherein the operations performed by the second data communication tier on the received data include averaging at least a portion of the received data.

8. The filtration system with multitiered data exchange capabilities of claim 1, wherein the operations performed by the second data communication tier on the received data include calculating at least one of the mean and the standard deviation of at least a portion of the received data.

9. The filtration system with multitiered data exchange capabilities of claim 1, wherein the operations performed by the second data communication tier on the received data include filtering elements of the received data.

10. The filtration system with multitiered data exchange capabilities of claim 1, wherein the operations performed by the second data communication tier on the received data include disposing portions of the received data.

11. The filtration system with multitiered data exchange capabilities of claim 1, wherein the operations performed by the second data communication tier on the received data include normalizing the received data.

12. The filtration system with multitiered data exchange capabilities of claim 1, wherein the first sensor is at least one selected from the group consisting of a pressure sensor, a temperature sensor, and a proximity sensor.

13. The filtration system with multitiered data exchange capabilities of claim 1, the first data communication tier further comprising a second sensor configured to generate data.

14. The filtration system with multitiered data exchange capabilities of claim 13, wherein the second sensor is at least one selected from the group consisting of a pressure sensor, a temperature sensor, and a proximity sensor.

15. The filtration system with multitiered data exchange capabilities of claim 1, wherein the second data communication tier sends data to the first data communication tier specifying previous filter elements installed in the filtration system.

16. The filtration system with multitiered data exchange capabilities of claim 1, wherein the filter element has previously been installed in a different filtration system and the data storage element is configured to store information pertaining to the previous filtration system and to transmit the information to the second data communication tier and/or the third data communication tier.

17. A filtration system with multitiered data exchange capabilities comprising:
a first data communication tier comprising
a filter element, the filter element comprising a data storage element;
a filter element housing configured to removably receive the filter element, wherein the filter element is configured to be removed from the filter element housing and replaced with a second filter element;
a second data communication tier comprising
a reader device comprising
a processing circuit; and
a communication circuit; and
wherein the filtration system is configured to detect a power on stage, and upon detecting the power on stage, the first data communication tier is configured to send data regarding a unique identifier of the filter element to the second data communication tier;
wherein the second data communication tier is configured to:
store the unique identifier of the filter element;
compare the unique identifier of the filter element to one or more previously stored unique identifiers; and
if the unique identifier of the filter element does not match the previously stored unique identifiers, record an indication that a new filter element has been installed along with a timestamp.

18. The filtration system of claim 17, the data from the first data communication uniquely identifying the filter element comprising a product serial number.

* * * * *